US012214939B2

(12) United States Patent
Kelley et al.

(10) Patent No.: US 12,214,939 B2
(45) Date of Patent: Feb. 4, 2025

(54) LIQUID CONTAINERS HAVING A VENT STRUCTURE PROMOTING IMPROVED LIQUID DISPENSING

(71) Applicant: Patrick Kevin Kelley, Austin, TX (US)

(72) Inventors: Patrick Kevin Kelley, Austin, TX (US); Christopher Barlow Aldridge, Austin, TX (US)

(73) Assignee: Patrick Kevin Kelley, Austin, TX (US)

(*) Notice: Subject to any disclaimer, the term of this patent is extended or adjusted under 35 U.S.C. 154(b) by 199 days.

(21) Appl. No.: 18/062,541

(22) Filed: Dec. 6, 2022

(65) Prior Publication Data

US 2023/0105310 A1 Apr. 6, 2023

Related U.S. Application Data

(63) Continuation of application No. 17/512,799, filed on Oct. 28, 2021, now Pat. No. 11,554,904, which is a continuation of application No. 17/122,339, filed on Dec. 15, 2020, now Pat. No. 11,203,469, which is a continuation of application No. 17/073,609, filed on Oct. 19, 2020, now Pat. No. 10,934,066.

(51) Int. Cl.

| | |
|---|---|
| ***B65D 47/32*** | (2006.01) |
| ***B65D 25/28*** | (2006.01) |
| ***B67D 7/32*** | (2010.01) |

(52) U.S. Cl.
CPC ......... *B65D 47/32* (2013.01); *B65D 25/2897* (2013.01); *B67D 7/3227* (2013.01)

(58) Field of Classification Search
CPC ........................... B65D 47/32; B65D 25/2897; B65D 25/2894; B67D 7/3227
See application file for complete search history.

(56) References Cited

U.S. PATENT DOCUMENTS

| | | | |
|---|---|---|---|
| 1,115,405 | A | 10/1914 | David |
| 2,291,230 | A | 10/1941 | Johnson |
| 3,630,419 | A | 12/1971 | Pierce |
| 3,746,200 | A | 7/1973 | Flider |
| 3,834,594 | A | 9/1974 | Schiemann |
| 3,927,797 | A | 12/1975 | Flider |
| 4,588,111 | A | 5/1986 | Hestehav |
| 4,781,314 | A | 11/1988 | Schoonover et al. |
| 4,834,269 | A | 5/1989 | Cone |
| 4,923,098 | A | 5/1990 | Schoonover et al. |
| 5,056,691 | A | 10/1991 | Tolbert |
| 5,472,124 | A | 12/1995 | Martushev |
| 5,597,097 | A | 1/1997 | Morris |
| 5,711,355 | A | 1/1998 | Kowalcyzk |

(Continued)

OTHER PUBLICATIONS

5 Gallon Quikfill Fuel Jug, https://hunsakerusa.com/collections/5-gallon-quikfill-jugs, downloaded on Oct. 11, 20202.

*Primary Examiner* — Vishal Pancholi
(74) *Attorney, Agent, or Firm* — David O. Simmons; IVC Patent Agency

(57) ABSTRACT

Disclosed herein are embodiments of liquid dispensing container preferably configured as portable, handheld liquid dispensing containers. These liquid dispensing containers possesses a vent structure that provides improved liquid dispensing along with simplified vent construction and container integration. In these regards, these liquid dispensing containers advantageously overcome one or more shortcomings associated conventional liquid dispensing containers and other types of containers.

20 Claims, 3 Drawing Sheets

(56) References Cited

U.S. PATENT DOCUMENTS

| | | | |
|---|---|---|---|
| 6,494,344 | B1 | 12/2002 | Kressel, Sr. |
| 7,051,891 | B2 | 5/2006 | Darr et al. |
| D527,639 | S | 9/2006 | Voss et al. |
| D636,056 | S | 4/2011 | Pritchard |
| 7,959,044 | B1 | 6/2011 | Christian et al. |
| 9,096,357 | B2 | 8/2015 | Brausen |
| 9,415,994 | B2 | 8/2016 | Ouderkirk |
| 10,273,056 | B2 | 8/2019 | Hoffman et al. |
| 2004/0108340 | A1 | 6/2004 | Witt |
| 2006/0201902 | A1 | 9/2006 | Brown et al. |
| 2012/0228338 | A1 | 9/2012 | Magley, II |
| 2012/0318829 | A1 | 12/2012 | Bonner |
| 2014/0332568 | A1 | 11/2014 | Stratton |
| 2018/0327250 | A1 | 11/2018 | Boucher et al. |

LIQUID CONTAINERS HAVING A VENT STRUCTURE PROMOTING IMPROVED LIQUID DISPENSING

CROSS-REFERENCE TO RELATED APPLICATIONS

This continuation patent application claims priority from U.S. Non-Provisional patent application Ser. No. 17/512,799, filed 28 Oct. 2021, entitled "LIQUID CONTAINERS HAVING A VENT STRUCTURE PROMOTING IMPROVED LIQUID DISPENSING," which claims priority as a continuation patent application from U.S. Non-Provisional patent application Ser. No. 17/122,339, filed 15 Dec. 2020, entitled "LIQUID CONTAINERS HAVING A VENT STRUCTURE PROMOTING IMPROVED LIQUID DISPENSING," now U.S. Pat. No. 11,203,469, which claims priority as a continuation patent application claims from U.S. Non-Provisional patent application Ser. No. 17/073,609, filed 19 Oct. 2020, entitled "LIQUID CONTAINERS HAVING A VENT STRUCTURE PROMOTING IMPROVED LIQUID DISPENSING," now U.S. Pat. No. 10,934,066, all of which have a common applicant herewith and are being incorporated herein in their entirety by reference.

FIELD OF THE DISCLOSURE

The disclosures made herein relate generally to liquid dispensing containers and, more particularly, to liquid dispensing containers having a vent structure promoting improved liquid dispensing.

BACKGROUND

It is well known that portable, handheld liquid dispensing containers are a type of liquid dispensing container that are available and useful in a number of shapes and sizes, and are made for a number of purposes. Such liquid dispensing containers are also well known to be useful for transporting and dispensing various types of liquids. Examples of these liquids include, but are not limited to, fuels, lubricants, water and the like.

It is desirable for liquid within an interior space of a portable, handheld liquid dispensing container to be dispensable through a dispensing structure of the container in a relatively smooth and uniform liquid flow. To this end, portable, handheld liquid containers include a vent structure that allows dispensed liquid to be replaced with ambient air. However, a common problem with many conventional portable, handheld liquid dispensing containers (and other types of liquid dispensing containers) is that the vent tube structure exhibits one of several shortcomings. One such shortcoming is that the vent structure is prone to allowing liquid to spill from the vent structure during dispensing when the liquid dispensing container is tipped beyond a certain container rotation amount. Another such shortcoming is that the construction of the vent offers an inadequate volumetric flow of ambient air into the interior space of the container. This inadequate volumetric flow of ambient air can cause all or a portion of the liquid in the container to not be dispensed in a suitably smooth and uniform liquid flow (e.g., to be dispensed with a "glugging" action) and/or can cause all or a portion of the liquid in the container to be dispensed at a less than optimal or preferred volumetric flow rate. Still another such shortcoming is that the construction of the vent is cumbersome to fabricate and/or integrate into the container. Still another shortcoming is that pouring contents of an often heavy dispensing container into a receiving container requires a user to precisely position a spout of such a heavy dispensing container relative to an inlet of the receiving container. The inability of the user to precisely position the dispensing container relative to the receiving container during such pouring often contributes to spilling of contents of the dispensing container during pouring.

Therefore, a liquid dispensing container (and particularly a portable, handheld liquid dispensing container) that overcomes one or more shortcomings associated with conventional portable, handheld liquid dispensing containers and other types of liquid dispensing containers would be advantageous, desirable and useful.

SUMMARY OF THE DISCLOSURE

Embodiments of the present invention are directed to liquid dispensing containers exhibiting improved liquid dispensing and ease of operator dispensing. More specifically, embodiments of the present invention are directed to portable, handheld liquid dispensing containers having a vent structure that provides improved liquid dispensing (e.g., dispensing rate, dispensing uniformity/smoothness, and the like) along with simplified vent construction and container integration. In these regards, embodiments of the present invention advantageously overcome one or more shortcomings associated conventional portable, handheld liquid dispensing containers and other types of containers, facilitating dispensing of liquid contents thereby reducing unwanted and potentially dangerous spillage.

In one embodiment of the present invention, a liquid dispensing container comprises a liquid container having a plurality of walls defining an interior space therebetween, a venting device attached to a first upper one of the walls (i.e., the first upper wall) and a liquid delivery device mounting body attached to a second upper one of the walls (i.e., the second upper wall). The venting device includes a venting conduit within the interior space. A first end portion of the venting conduit is adjacent the first upper wall and a second end portion of the venting conduit is adjacent a bottom one of the walls (i.e., the bottom wall). The venting conduit includes a central passage extending between the first and second end portions thereof. The liquid delivery device mounting body has a central passage extending therethrough. The second upper wall is laterally spaced away from the first upper wall and is vertically spaced below the first upper walls relative to the bottom wall.

In another embodiment of the present invention, a liquid dispensing container comprises a liquid container, a venting device mounting body, a liquid delivery device mounting body and a venting device. The liquid container has an interior space therein that is at least partially defined by opposing sidewalls, opposing end walls, a bottom wall, a first upper wall and a second upper wall. The bottom wall is adapted for enabling the liquid container to rest thereupon when in a surface-supported container storage position. A first one of the end walls (the first end wall) is adapted for enabling the liquid container to rest thereupon when in a surface-supported liquid dispensing position. The venting device mounting body is attached to the first upper wall and has a central passage therein extending through the first upper wall. The liquid delivery device mounting body is attached to the second upper wall and has a central passage therein extending through the second upper wall. The second upper wall is laterally spaced away from the first upper wall. The second upper wall is vertically spaced below the first upper wall relative to the bottom wall. The liquid delivery device mounting body is located adjacent to the first end wall. The venting device is mounted on the venting device mounting body. The venting device includes a vent tube within the interior space. The vent tube has a first end portion attached to the venting device mounting body and a second end portion adjacent to the bottom wall. The vent tube includes a central passage extending between the first and second end portions thereof. The central passage of the vent tube is in liquid communication with an ambient environment surrounding the liquid container and with the interior space.

In another embodiment of the present invention, a liquid dispensing container comprises a liquid container including a plurality of walls, a vent tube mounting body, a liquid delivery device mounting body and a vent tube. An interior space, a first hand-gripping structure, a second hand-gripping structure, a first container support surface upon which the liquid container rests when in a surface-supported container storage position and a second container support surface upon which the liquid container rests when in a surface-supported liquid dispensing position are each jointly defined by a respective portion of one or more of the plurality of walls. The first hand-gripping structure is opposite the first container support surface and the second hand-gripping structure is opposite the second container support surface. The vent tube mounting body is attached to a first upper one of the walls (the first upper wall) that is adjacent to the first hand-gripping structure and has a passage therein extending through the first upper one of the walls. The liquid delivery device mounting body is attached to a second upper one of the walls (the second upper wall) that is adjacent to the first hand-gripping structure and has a passage therein extending through the second upper wall. The second upper wall is laterally spaced away from the first upper wall. The first hand-gripping structure is positioned between the first and second upper walls. The second upper wall is vertically spaced below the first upper wall relative to a bottom one of the walls (the bottom wall) that at least partially defines the first container support surface. The liquid delivery device mounting body is located adjacent to a container supporting one of the walls that at least partially defines the second container support surface. The vent tube is within the interior space. A first end portion of the vent tube is attached to the venting device mounting body and a second end portion of the vent tube is located adjacent to the bottom wall. The vent tube includes a central passage extending between the first and second end portions thereof. The central passage of the vent tube is in liquid communication with an ambient environment surrounding the liquid container and with the interior space.

In one or more embodiments, the venting conduit can comprise an elongated tube with a central passage having an approximately straight longitudinal axis.

In one or more embodiments, a linear distance between the first and second end portions of the vent tube can be greater than a linear distance between the second upper one of the walls and the bottom one of the walls.

In one or more embodiments, the longitudinal axis of the vent tube can be skewed with respect to a longitudinal axis of the central passage of the liquid delivery device mounting body such that the first end portion of the vent tube is laterally spaced away from the longitudinal axis of the central passage of the liquid delivery device mounting body by a first distance and the second end portion of the vent tube is laterally spaced away from the longitudinal axis of the central passage of the liquid delivery device mounting body by a second distance less than the first distance to thereby promote draining of liquid from within the central passage of the vent tube into the interior space when the liquid container is in (or near) a surface-supported liquid dispensing position.

In one or more embodiments, at least one of the walls of the liquid container can define a container support surface upon which the liquid container rests when in a surface-supported liquid dispensing position, the container support surface can define a reference plane extending parallel therewith and the longitudinal axis of the central passage of the liquid delivery device mounting body can extend parallel with the reference plane.

In one or more embodiments, the at least one of the walls of the liquid container can comprise a plurality of raised members that jointly define the container support surface.

In one or more embodiments, the container support surface upon which the liquid container rests when in a surface-supported liquid dispensing position can define a reference plane extending parallel therewith, the at least one of the walls of the liquid container that comprising the container support surface upon which the liquid container rests when in a surface-supported liquid dispensing position can define a reference plane extending parallel with a surface thereof that partially defines the interior space and the reference plane defined by the container support surface can be skewed with respect to the reference plane defined by the at least one of the walls of the liquid container such that the surface of the at least one of the walls of the liquid container that partially defines the interior space slopes toward the liquid delivery device mounting body to thereby promote draining of liquid from within the interior space through the central passage of the liquid delivery device mounting body when the liquid container is in the surface-supported liquid dispensing position.

In one or more embodiments, at least one of the walls of the liquid container can comprise a container support surface upon which the liquid container rests when in a surface-supported liquid dispensing position, the central passage of the vent tube can have a longitudinal axis that is approximately straight and the longitudinal axis of the vent tube can be skewed with respect to a reference plane extending parallel with the container support surface such that the first end portion of the vent tube is laterally spaced away from the container support surface by a first distance and the second end portion of the vent tube is laterally spaced away from the container support surface by a second distance less than the first distance to thereby promote draining of liquid from within the central passage of the vent tube into the interior space when the liquid container is in the surface-supported liquid dispensing position.

In one or more embodiments, the liquid container can comprise a hand-gripping structure opposite a bottom wall of the liquid container, a first upper wall of the liquid container can be vertically positioned proximate a top portion of the hand-gripping structure and a second upper wall of the liquid container can be vertically positioned one of level with a lowermost portion of the hand-gripping structure and below the lowermost portion of the hand-gripping structure.

In one or more embodiments, at least one of the walls of the liquid container can comprise a container support surface upon which the liquid container rests when in a surface-supported liquid dispensing position, the liquid container can comprise a hand-gripping structure attached to a portion of the liquid container generally opposite the container support surface and the vent tube can extend through the hand-gripping structure.

These and other objects, embodiments, advantages and/or distinctions of the present invention will become readily apparent upon further review of the following specification, associated drawings and appended claims.

DETAILED DESCRIPTION

Figure 1:
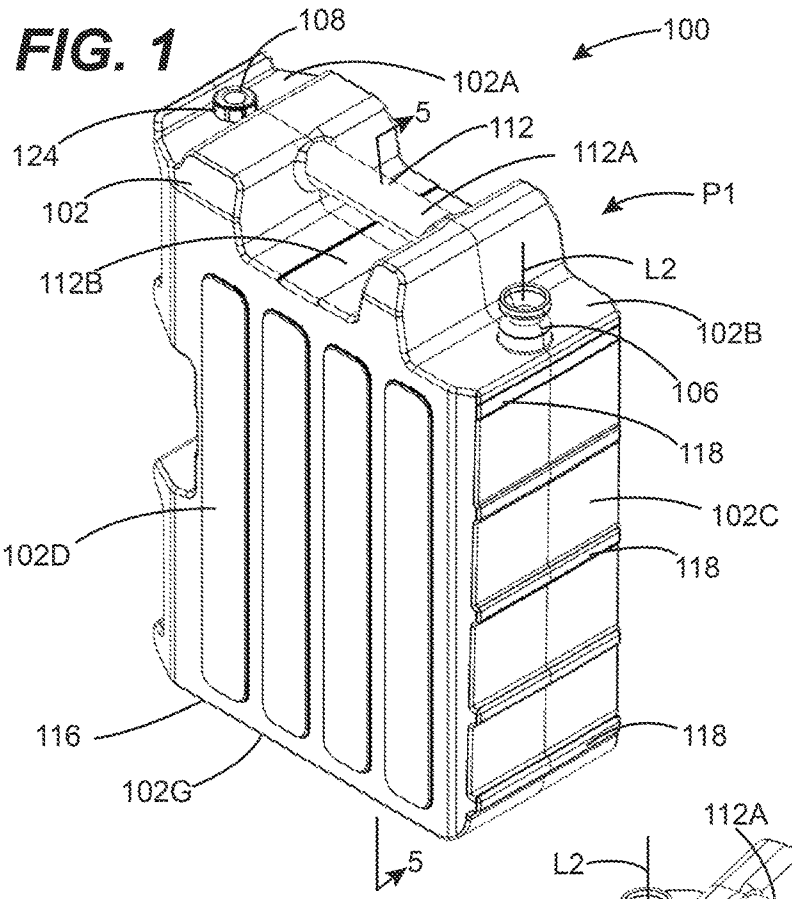
FIG. 1 is a first perspective view showing a liquid dispensing container in accordance with one or more embodiments of the present invention.
Figure 2:
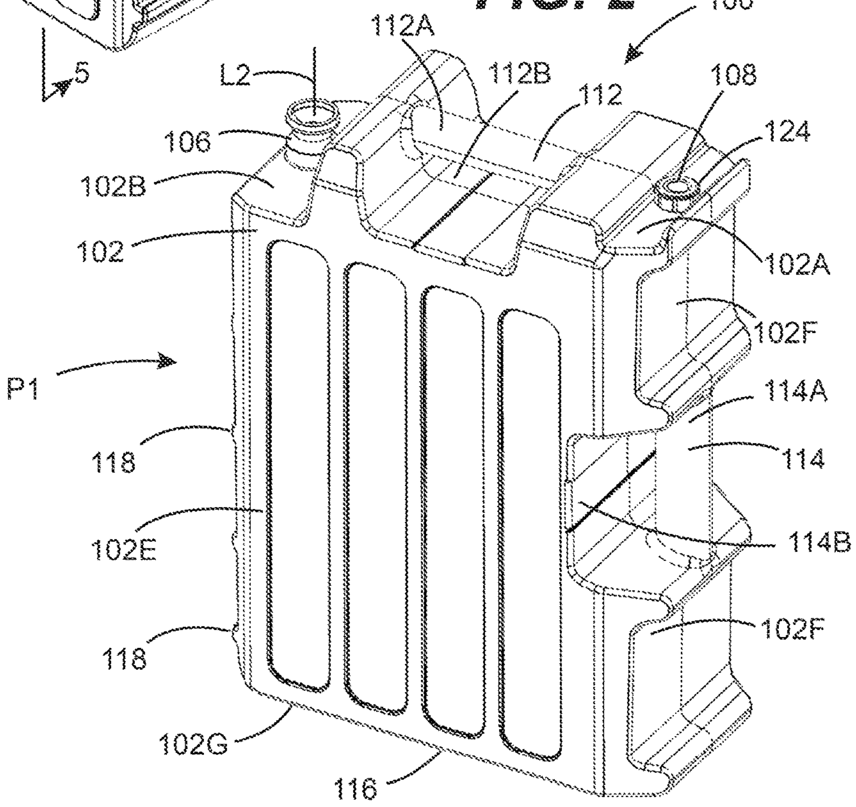
FIG. 2 is a second perspective view of the liquid dispensing container shown in FIG. 1.

Referring to FIGS. 1-5, a liquid dispensing container configured in accordance with one or more embodiment of the present invention is shown (i.e., the liquid dispensing container 100). As shown, the liquid dispensing container 100 is a portable, handheld liquid dispensing container. However, in one or more other embodiments, the liquid dispensing container 100 can be a non-portable and/or non-handheld liquid dispensing container. Advantageously, the liquid dispensing container 100 possesses a vent structure that provides improved liquid dispensing along with simplified vent construction and container integration. In these regards, the liquid dispensing container 100 advantageously overcomes one or more shortcomings associated conventional portable, handheld liquid dispensing containers and other types of containers.

The liquid dispensing container 100 comprises a liquid container 102 (including a plurality of walls 102A-102G), a vent tube mounting body 104, a liquid delivery device mounting body 106 and a vent device 108. The liquid container 102 can be fabricated using any one of a number of fabrication techniques—e.g., blow-molding, rotational molding, 3D printing and the like. An interior space 110, a first hand-gripping structure 112, a second hand gripping structure 114, a first container support surface 116 upon which the liquid container 102 rests when in a surface-supported container storage position P1 and a second container support surface 118 upon which the liquid container 102 rests when in a surface-supported liquid dispensing position P2 (i.e., rotated nominally 90-degrees from the surface-supported container storage position P1) are each jointly defined by a respective portion of one or more of the plurality of walls 102A-102G of the liquid container 102.

The first hand-gripping structure 112 is opposite the first container support surface 116. The second hand-gripping structure 114 is opposite the second container support surface 118. The first and second hand-gripping structures 112, 114 each include a respective hand-gripping body 112A, 114A and a respective hand-passage extending between the respective hand-gripping body 112A, 114A (i.e., respective walls of the liquid container 102) and a respective underlying hand-passage wall 112B, 114B (i.e., respective walls of the liquid container 102). It is disclosed herein that the first and second hand-gripping structures 112, 114 can be configured in a variety of other constructions that enable a user to securely grasp and manipulate the liquid dispensing container 100. For example, the first and second hand-gripping structures 112, 114 can be constructed of one or more walls that do not form a portion of the interior space 110 of the liquid container 102.

The vent tube mounting body 104 is attached to a first upper wall 102A of the container body 102. The first upper wall 102A is adjacent to the first hand-gripping structure 112 and has a central passage 120 therein (FIG. 5) extending through the first upper wall 102A. In preferred embodiments, as shown, the vent tube mounting body 104 is a unitary component (e.g., molded-in, cast-in, etc.) of the container body 102. In other embodiments, the vent tube mounting body 104 can be a discrete component that is attached to the container body 102 during or after its fabrication—e.g., via mechanical engagement, bonded engagement or the like.

The liquid delivery device mounting body 106 is attached to a second upper wall 102B that is adjacent to the first hand-gripping structure 112 and adjacent to a second container supporting wall 102C that comprises (e.g., at least partially defines) the second container support surface 118. In preferred embodiments, as shown, the liquid delivery device mounting body 106 is a unitary component (e.g., molded-in, cast-in, etc.) of the container body 102. In other embodiments, the liquid delivery device mounting body 106 can be a discrete component that is attached to the container body 102 during or after its fabrication—e.g., via mechanical engagement, bonded engagement or the like.

As shown, in one or more embodiments, the second container supporting wall 102C can comprise a plurality of raised members 121 that jointly define the second container support surface 118. The liquid delivery device mounting body 106 has a central passage 122 therein (FIG. 5) that extends through the second upper wall 102B. The second upper wall 102B is laterally spaced away from the first upper wall 102A. The first hand-gripping structure 112 is positioned between the first and second upper walls 102A, 102B. The second upper wall 102A is vertically spaced below the first upper wall 102A relative to a first container supporting wall 102G (i.e., a bottom wall) that at least partially defines the first container support surface 116.

Figure 5:
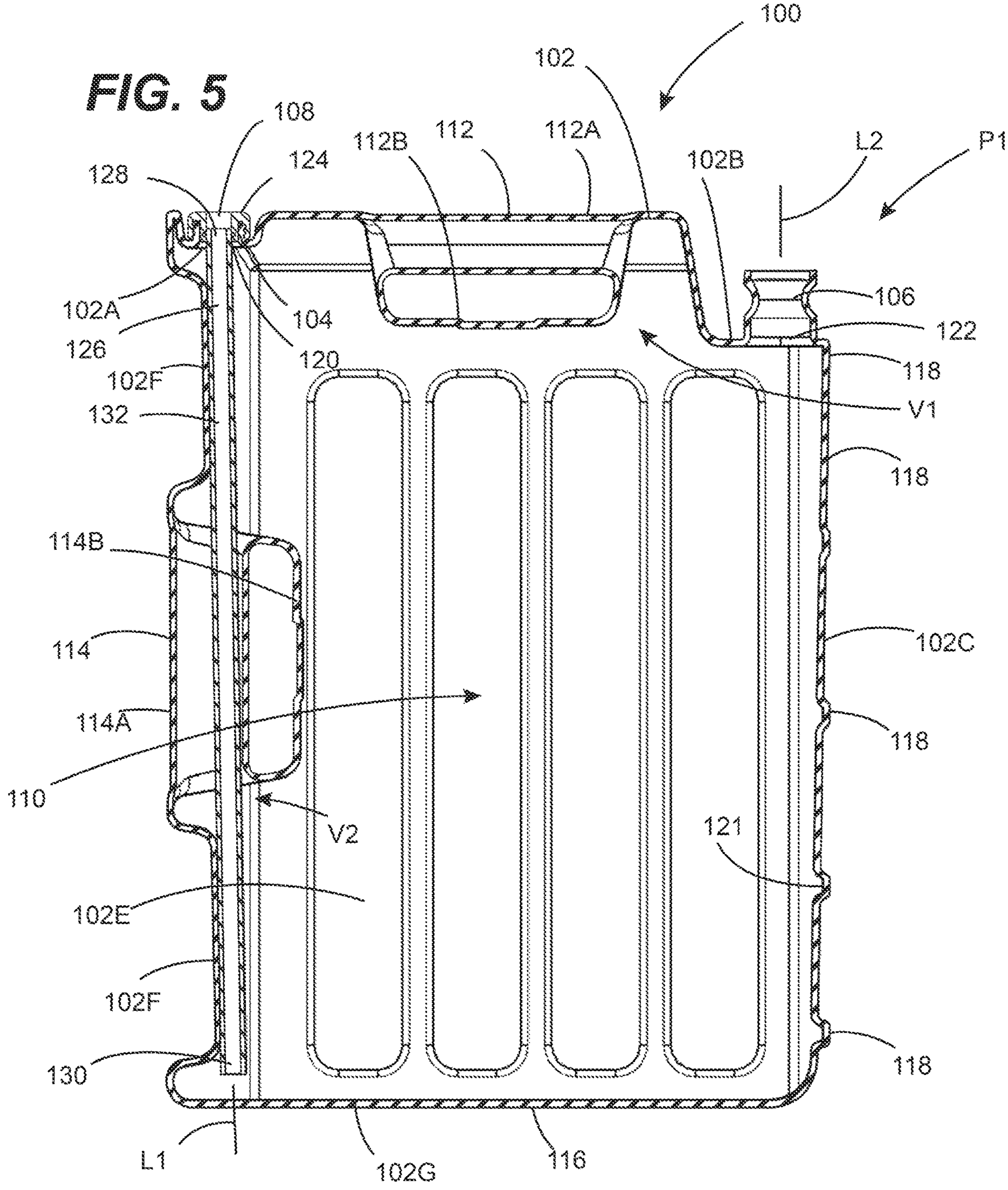
FIG. 5 is a cross-sectional view taken along the line 5-5 in FIG. 1.

In one or more embodiments, as shown in FIG. 5, the second container support surface 118 is defined by a plurality of raised members that preferably each have one or more surfaces that all lie in a common plane. The second container support surface 118 defines a reference plane extending parallel with such one or more surfaces of each of the raised members and the second container supporting wall 102C defines a reference plane extending parallel with a surface thereof (i.e., interior surface) that partially defines the interior space 110. To promote draining of liquid from within the interior space 110 of the liquid container 102 through the central passage 134 of the liquid delivery device mounting body 106 when the liquid container 102 is in the surface-supported liquid dispensing position P2, the reference plane defined by the second container support surface 118 is skewed with respect to the reference plane defined by the interior surface of the second container supporting wall 102C such that the interior surface of the second container supporting wall 102C slopes toward the liquid delivery device mounting body 106.

In one or more preferred embodiments, the liquid delivery device mounting body 106 can be configured as a male cam-lock type of connector that is matingly and securely engageable with a female cam-lock type of connector. In one or more other embodiments, the liquid delivery device mounting body 106 can be configured as a barbed connector, a threaded connector or the like. It is disclosed herein that the liquid delivery device mounting body 106 is not unnecessarily limited to any particular type or configuration of connector.

As shown in FIG. 5, the venting device 108 is attached to the vent tube mounting body 104. The venting device 108 includes a vent tube cap 124 and a vent tube 126. The vent tube cap 124 is engaged (e.g., threadedly) with the vent tube mounting body 104 and the vent tube 126 is engaged with the vent tube cap 124, the vent tube mounting body 104 or both. The vent tube 126 includes a central passage 132 extending between its first and second end portions 128, 130. The central passage 132 of the vent tube 126 is in liquid communication with an ambient environment surrounding the liquid container and with the interior space 110.

In one or more preferred embodiments, as shown, the vent tube 126 can be or include an elongated tube with a central passage having an approximately straight longitudinal axis L1. In preferred embodiments, the elongated tube ca be rigid or semi-rigid and can be made from a polymeric material (e.g., polyethylene or polypropylene).

The vent tube 126 is located within the interior space 110 of the liquid container 102 and can extend through the first hand-gripping structure 112 (e.g., a portion that partially defines the interior space 110 of the liquid container 102), as shown in FIG. 5. The vent tube 126 has a first end portion 128 coupled to the venting device mounting body 104 and a second end portion 130 adjacent to the bottom wall 102G of the liquid container 102. A person of ordinary skill in the art will appreciate that the vent tube 126 is one example of a venting conduit characterized by a structural body having opposing ends with a central passage extending between such opposing ends.

Advantageously, a linear distance between the first and second end portions 128, 130 of the vent tube 126 is greater than a linear distance between the second upper one wall 102B and the bottom wall 102G. Accordingly, with the first end portion 128 of the vent tube 126 attached to the first upper wall 102A, the vent tube 126 extends from above the second upper one wall 102B to well below the second upper one wall 102B—i.e., preferably to close proximity (i.e., adjacent to) to the bottom wall 102G (e.g., within 0.25" to 1.0" from the bottom wall 102G).

Figure 3:
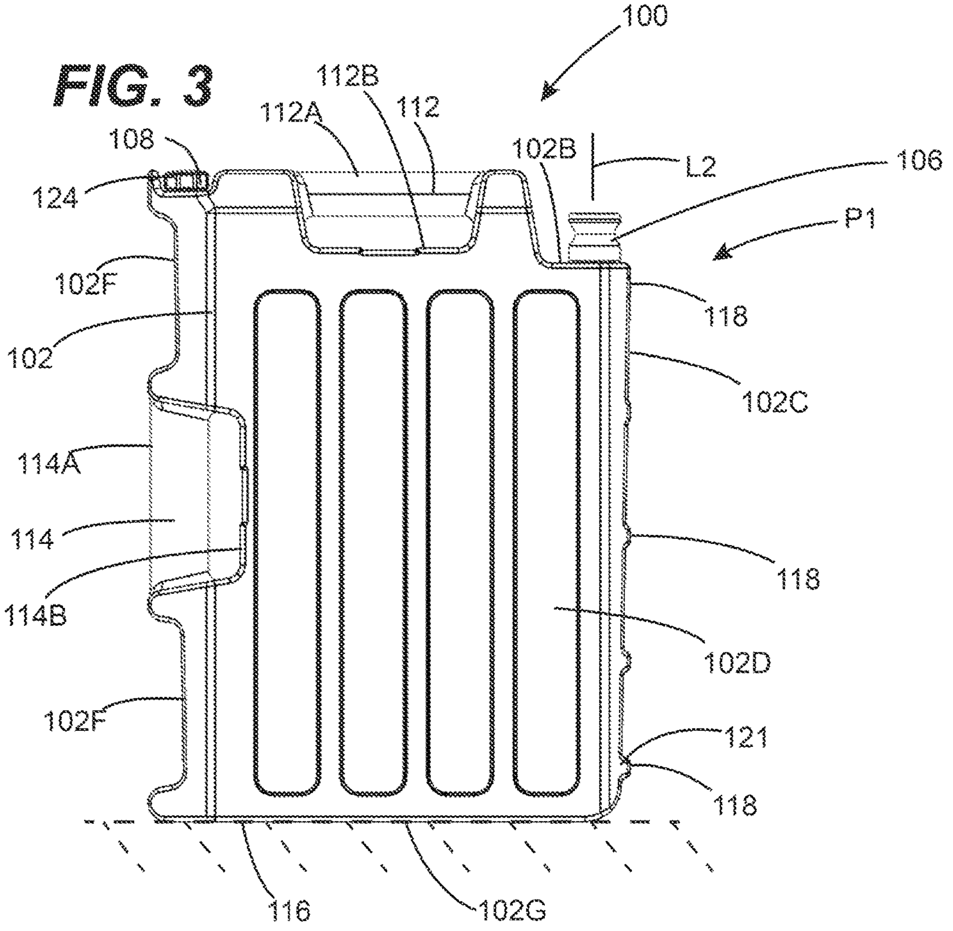
FIG. 3 is a side view of the liquid dispensing container shown in FIG. 1, showing the liquid dispensing container in a surface-supported container storage position.
Figure 4:
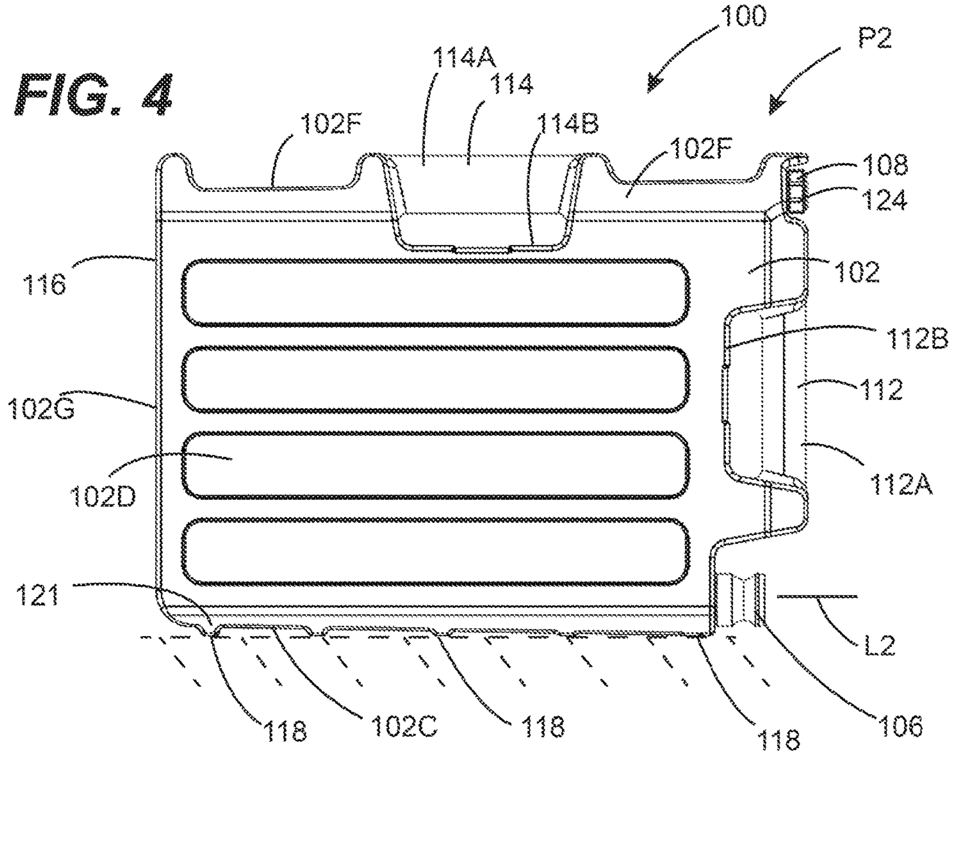
FIG. 4 is a side view of the liquid dispensing container shown in FIG. 1, showing the liquid dispensing container in a surface-supported liquid dispensing position.

Spilling of liquid being dispensed from a portable, hand-held liquid dispensing containers during liquid dispensing when in a hand-held liquid dispensing position (i.e., manually held in a position rotated from the surface-supported liquid storage position P1 shown in FIG. 3) and/or during an over-tipped emptying position (i.e., rotated beyond the surface-supported liquid dispensing position P2 shown in FIG. 4) is highly undesirable. This is particularly true in the case of the liquid being environmentally unfriendly and/or flammable—e.g., a fuel. As is well-known, such spillage with conventional liquid containers often arises from non-smooth and/or non-uniform liquid flow (i.e., "glugging") causing a portion of a stream of dispensed liquid to miss entry into an intended target (e.g., tank filler opening or a funnel opening) and/or from liquid spilling from a vent opening of the liquid container. Advantageously, liquid dispensing containers configured in accordance with embodiments of the present invention are configured for limiting if not eliminating the potential liquid spillage during such dispensing conditions.

Three aspects of liquid dispensing containers configured in accordance with at least preferred embodiments of the present invention can individually, severally or jointly contribute to limiting if not eliminating the potential for liquid spillage during the aforementioned dispensing conditions. A first one of these aspects is the position of the first upper wall 102A relative to the second upper wall 102B. A second one of these aspects is the vertical placement of the first and second end portions 128, 130 of the vent tube 126 relative to the second upper wall 102B and the bottom wall 102G. A third one of these aspects is the configuration and orientation of the vent tube 126 relative to the second container support surface 118.

As shown in FIGS. 1-5, the first hand-gripping structure 112 forms part of the interior space 110, has an upper portion thereof vertically adjacent to the first upper wall 102A, has a lower portion thereof vertically adjacent to the second upper wall 102B and is located between the first and second upper walls 102A, 102B. The first upper wall 102A is preferably vertically positioned proximate a top portion of the first hand-gripping structure and the second upper wall 102B is preferably vertically positioned level with or below a lowermost portion of the first hand-gripping structure 112. As can be seen, this configuration and positioning of the first hand-gripping structure 112 relative to the location of the first upper wall 102A and the second upper wall 102B results in an upper portion of the liquid container 102 defining a first air volume space V1 that can be at least partially above the second upper wall 102B. In view of a vent tube cap 124 of the vent device 108 being in sealed (or leak resistant) engagement with the vent tube mounting body 104, the first end portion 128 of the vent tube 126 being in sealed engagement with the vent tube cap 124 and the second end portion 130 of the vent tube 126 residing below the second upper wall 102B, all or a majority portion of the first air volume space V1 remains filled with air when the liquid container 102 is filled with liquid while the liquid container 102 is in (or near) the surface-supported container storage position P1 (FIG. 3, with the liquid container resting on the container supporting wall 102G thereof).

When the liquid-filled liquid container 102 is rotated from (or near) the surface-supported container storage position P1 to (or near) the surface-supported liquid dispensing position P2 (FIG. 4, with the liquid container resting on the second container supporting wall 102C thereof), the air within the first air volume space V1 becomes captured within a second air volume space V2 of the liquid container 102 that is generally opposite (i.e., above) the second container supporting wall 102C. As best shown in FIGS. 4 and 5, the second air volume space V2 is defined by the second hand-gripping structure 114 and adjacent ones of the walls of the liquid container 102 (e.g., walls 102A, 102E, 102F, 116). As a person of ordinary skill in the art will understand, an air volume in the first air volume space V1 will be equal to or approximately equal to an initial air volume in the second air volume space V2 (i.e., prior to commencement of fluid dispensing).

To promote the aforementioned anti-spill functionality, the vent device 108 is preferably configured and arranged in conjunction with attributes of the second air volume space V2. First, the vent tube 124 is preferably configured and arranged to be at least partially located within the second air volume space V2 when the liquid container 102 becomes positioned in (or near) the surface-supported liquid dispensing position P2 after liquid filling while in (or near) the surface-supported container storage position P1. To this end, as best shown in FIG. 5, the vent tube 126 can be positioned adjacent to a portion of the interior space 110 that is generally opposite the second container supporting wall 102C—i.e., a portion of the interior space at least partially defined by end wall 102F and the second hand-gripping structure 114. Second, the vent tube 126 is preferably configured and arranged such that the longitudinal axis of the central passage 132 of the vent tube 126 is skewed with respect to a longitudinal axis L2 of the central passage 134 of the liquid delivery device mounting body 106. In this skewed arrangement, the first end portion 128 of the vent tube 126 is laterally spaced away from the longitudinal axis L2 of the central passage of the liquid delivery device mounting body 106 by a first distance and the second end portion 130 of the vent tube 126 is laterally spaced away from the longitudinal axis L2 of the central passage 134 of the liquid delivery device mounting body 106 by a second distance less than the first distance. This skewed arrangement of the central passage 132 of the vent tube 126 advantageously promotes draining of liquid from within the central passage 132 of the vent tube 126 into the interior space 110 when the liquid container 102 is rotated from (or near) the surface-supported liquid storage position P1 to (or near) the surface-supported liquid dispensing position P2. These configurations and arrangements of the vent tube not only limit the potential for liquid spilling, but also provide for improved liquid dispensing as a result of a free-flowing vent tube.

As shown best in FIG. 5, all or a portion of an interior surface of the end wall 102F opposite the second support surface 118 serve as a support surfaces for the vent tube 124. To this end, the end wall 102F opposite the second support surface 118 can be angled (i.e., skewed) with respect to the longitudinal axis L2 of the central passage of the liquid delivery device mounting body 106 and the vent tube 124 can be engaged with this interior wall to facilitate positioning of the vent tube 124 (e.g., skewed positioning). Similarly, the hand-gripping body 114A of the second hand-gripping structure 114 can be positioned and configuration to provide one or more surfaces with which the vent tube can be engaged to facilitate its positioning.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A liquid dispensing container, comprising:

a container body including an interior space, a bottom wall, a first hand-gripping structure opposite the bottom wall of the container body, a first upper wall vertically positioned proximate a top portion of the first hand-gripping structure, a second upper wall vertically positioned one of level with a lowermost portion of the first hand-gripping structure and below the lowermost portion of the first hand-gripping structure, and a second hand-gripping structure attached to a portion of the container body at a location spaced away from the first hand-gripping structure, wherein the second upper wall is laterally spaced away from the first upper wall and wherein a first end wall of the container body defines a first container support surface upon which the container body rests when in a surface-supported liquid dispensing position;

a vent tube having a first end portion and a second end portion, wherein the first end portion of the vent tube is attached to a vent tube attachment portion of the first upper wall of the container body, wherein the second end portion of the vent tube is adjacent the bottom wall, wherein the vent tube has a central passage extending between the first and second end portions thereof, wherein the central passage of the vent tube is exposed at the first end portion thereof to an ambient environment surrounding the container body through an opening within the vent tube attachment portion of the first upper wall whereby the central passage is in fluid communication with the ambient environment surrounding the container body and with the interior space, and wherein the vent tube extends through the second hand-gripping structure; and a liquid delivery body attached to the second upper wall of the container body and having a central passage extending therethrough.

2. The liquid dispensing container of claim 1 wherein:

the liquid delivery body is located adjacent to the first end wall; and an entire portion of the vent tube is located adjacent to a second end wall of the container body that is opposite the first end wall.

3. The liquid dispensing container of claim 1 wherein a linear distance between the first and second end portions of the venting conduit is greater than a linear distance between the second upper wall and the bottom wall.

4. The liquid dispensing container of claim 1 wherein:

the central passage of the vent tube has a longitudinal axis that is approximately straight; and a linear distance between the first and second end portions of the vent tube is greater than a linear distance between the second upper wall and the bottom wall.

5. The liquid dispensing container of claim 1 wherein:

the central passage of the vent tube has a longitudinal axis that is approximately straight; and the longitudinal axis of the vent tube is skewed with respect to a longitudinal axis of the central passage of the liquid delivery body such that the first end portion of the vent tube is laterally spaced away from the longitudinal axis of the central passage of the liquid delivery body by a first distance and the second end portion of the vent tube is laterally spaced away from the longitudinal axis of the central passage of the liquid delivery body by a second distance less than the first distance to thereby promote draining of liquid from within the central passage of the vent tube into the interior space when the container body is in the surface-supported liquid dispensing position.

6. The liquid dispensing container of claim 5 wherein a linear distance between the first and second end portions of the venting conduit is greater than a linear distance between the second upper wall and the bottom wall.

7. The liquid dispensing container of claim 1 wherein:

the first end wall comprises a plurality of raised members that jointly define the first container support surface;

the first container support surface defines a reference plane extending parallel therewith;

the first end wall defines a reference plane extending parallel with a surface thereof that partially defines the interior space; and the reference plane defined by the first container support surface is skewed with respect to the reference plane defined by the first end wall such that the surface of the first end wall partially defining the interior space slopes toward the liquid delivery body to thereby promote draining of liquid from within the interior space through the central passage of the liquid delivery body when the container body is in the surface-supported liquid dispensing position.

8. The liquid dispensing container of claim 7 wherein:

the central passage of the vent tube has a longitudinal axis that is approximately straight; and the longitudinal axis of the vent tube is skewed with respect to a reference plane extending parallel with the first container support surface such that the first end portion of the vent tube is laterally spaced away from the container support surface by a first distance and the second end portion of the vent tube is laterally spaced away from the container support surface by a second distance less than the first distance to thereby promote draining of liquid from within the central passage of the vent tube into the interior space when the container body is in the surface-supported liquid dispensing position.

9. The liquid dispensing container of claim 8 wherein a linear distance between the first and second end portions of the vent tube is greater than a linear distance between the second upper wall and the bottom wall.

10. The liquid dispensing container of claim 1 wherein the first hand-gripping structure is located centrally between the first upper wall and the bottom wall.

11. The liquid dispensing container of claim 1 wherein:

the first hand-gripping structure has an interior space; and the interior space of the container body includes the interior space of the first hand-gripping structure.

12. The liquid dispensing container of claim 11 wherein the vent tube passes through the interior space of the first hand-gripping structure.

13. The liquid dispensing container of claim 12 wherein:

the central passage of the vent tube has a longitudinal axis that is approximately straight; and the longitudinal axis of the vent tube is skewed with respect to a reference plane extending parallel with the first container support surface such that the first end portion of the vent tube is laterally spaced away from the container support surface by a first distance and the second end portion of the vent tube is laterally spaced away from the container support surface by a second distance less than the first distance to thereby promote draining of liquid from within the central passage of the vent tube into the interior space when the container body is in the surface-supported liquid dispensing position.

14. The liquid dispensing container of claim 13 wherein:

the first end wall comprises a plurality of raised members that jointly define the first container support surface;

the first container support surface defines a reference plane extending parallel therewith;

the first end wall defines a reference plane extending parallel with a surface thereof that partially defines the interior space; and the reference plane defined by the first container support surface is skewed with respect to the reference plane defined by the first end wall such that the surface of the first end wall partially defining the interior space slopes toward the liquid delivery body to thereby promote draining of liquid from within the interior space through the central passage of the liquid delivery body when the container body is in the surface-supported liquid dispensing position.

15. The liquid dispensing container of claim 1 wherein a hand-passage wall of the first hand-gripping structure at least partially defines the interior space of the container body.

16. The liquid dispensing container of claim 15 wherein the vent tube passes through an interior space of the first hand-gripping structure.

17. The liquid dispensing container of claim 15 wherein:

the central passage of the vent tube has a longitudinal axis that is approximately straight; and the longitudinal axis of the vent tube is skewed with respect to a reference plane extending parallel with the first container support surface such that the first end portion of the vent tube is laterally spaced away from the container support surface by a first distance and the second end portion of the vent tube is laterally spaced away from the container support surface by a second distance less than the first distance to thereby promote draining of liquid from within the central passage of the vent tube into the interior space when the container body is in the surface-supported liquid dispensing position.

18. The liquid dispensing container of claim 17 wherein the vent tube passes through an interior space of the first hand-gripping structure.

19. The liquid dispensing container of claim 18 wherein:

the first end wall comprises a plurality of raised members that jointly define the first container support surface;

the first container support surface defines a reference plane extending parallel therewith;

the first end wall defines a reference plane extending parallel with a surface thereof that partially defines the interior space; and the reference plane defined by the first container support surface is skewed with respect to the reference plane defined by the first end wall such that the surface of the first end wall partially defining the interior space slopes toward the liquid delivery body to thereby promote draining of liquid from within the interior space through the central passage of the liquid delivery body when the container body is in the surface-supported liquid dispensing position.

20. The liquid dispensing container of claim 19 wherein:

the liquid delivery body is located adjacent to the first end wall; and an entire portion of the vent tube is located adjacent to a second end wall of the container body that is opposite the first end wall.

* * * * *